US006700272B1

(12) United States Patent
Lindner

(10) Patent No.: US 6,700,272 B1
(45) Date of Patent: Mar. 2, 2004

(54) RELUCTANCE MOTOR WITH GEARLESS STEP-DOWN WITHOUT ELECTRONIC CONTROL OF ROTATING FIELD

(75) Inventor: Juergen Lindner, Worms (DE)

(73) Assignee: EMF 97 Elektro-Maschinen-Vertrieb-Magnettechnik- und Forschungs GmbH, Worms (DE)

( * ) Notice: Subject to any disclaimer, the term of this patent is extended or adjusted under 35 U.S.C. 154(b) by 0 days.

(21) Appl. No.: 09/613,627

(22) Filed: Jul. 11, 2000

Related U.S. Application Data

(63) Continuation of application No. 09/161,497, filed on Sep. 28, 1998.

(30) Foreign Application Priority Data

Sep. 30, 1997 (DE) .......................................... 197 43 380

(51) Int. Cl.⁷ .......................... H02K 19/10; H02K 16/02; H02K 21/44
(52) U.S. Cl. ........................ 310/166; 310/266; 310/181; 310/214; 310/168
(58) Field of Search ................................. 310/266, 114, 310/211, 162, 163, 166, 168, 181, 83, 214, 179, 180, 201; 318/701

(56) References Cited

U.S. PATENT DOCUMENTS

| 1,227,185 A | 5/1917 | Neuland |
| 1,260,674 A | 3/1918 | Jackson |

(List continued on next page.)

FOREIGN PATENT DOCUMENTS

| DE | 329 145 | 4/1976 |
| DE | 26 20 935 | 12/1976 |
| DE | 39 31 484 | 4/1991 |
| DE | 195 17 956 | 11/1995 |
| EP | 0 715 397 | 6/1996 |
| EP | 0 778 653 | 6/1997 |
| GB | 1107266 | 3/1968 |
| WO | WO 90/02437 | 3/1990 |
| WO | WO 93/07671 | 4/1993 |

OTHER PUBLICATIONS

"Electric Machines, Drives, and Power Systems", Wildi, Jan. 1981.*
W. Nürnberg "Die Asynchronmaschine" pp. 12–13, 1963.
R. Fischer "Elektrische Maschinen" pp. 150–151, 1989.

Primary Examiner—Karl Tamai
(74) Attorney, Agent, or Firm—Nixon Peabody LLP; David S. Safran

(57) ABSTRACT

A reluctance motor with a stator (1) which has a three-phase current stator winding for generating a rotary magnetic field and a rotor (3) which is located on the shaft (2) and which is made primarily of a ferromagnetic material. The rotor is formed of a predetermined number of angular regions of the same peripheral angle which adjoin one another in a circumferential direction and preferably have at least one pair of flux guidance regions (10, 11) facing the stator (1), with flux guidance properties which differ in the main direction of the rotary field. According to a first feature, the stator (1) has a preset number of angular regions of the same peripheral angle which adjoin one another in the circumferential direction, preferably having at least one pair of flux guidance regions (13, 14) facing the rotor (3) with flux guidance properties which differ in the main direction of the rotary field, and the number of angular regions (12) on the stator (1) differ from the number of angular regions (9) on the rotor (3) by an integral multiple of the pole number, preferably the simple pole number, of the three-phase current stator winding. Alternatively or together with the first feature, according to a second feature, the flux guidance regions (10, 11) and connecting elements for connection to shaft (2) of the reluctance motor (3) enclose a flux guidance rotor (27) which floats on shaft (2) via bearings and which is made of ferromagnetic material for returning of the lines of force of the rotary field.

28 Claims, 11 Drawing Sheets

U.S. PATENT DOCUMENTS

| | | | |
|---|---|---|---|
| 2,974,242 A | | 3/1961 | Apstein |
| 4,035,680 A | * | 7/1977 | Maeder .................... 310/168 |
| 4,048,531 A | | 9/1977 | Buess et al. |
| 4,639,626 A | | 1/1987 | McGee |
| 4,647,802 A | | 3/1987 | Konecny |
| 4,745,312 A | | 5/1988 | Nagasaka |
| 4,758,756 A | * | 7/1988 | Pouillange .................. 310/152 |
| 5,168,190 A | | 12/1992 | Bahn |
| 5,424,595 A | | 6/1995 | Preston et al. |
| 5,793,139 A | | 8/1998 | Nashiki |
| 6,087,742 A | * | 7/2000 | Maestre ....................... 310/12 |

* cited by examiner

RELUCTANCE MOTOR WITH GEARLESS STEP-DOWN WITHOUT ELECTRONIC CONTROL OF ROTATING FIELD

CROSS-REFERENCE TO RELATED APPLICATION

This application is a Continuation of application Ser. No. 09/161,497, filed Sep. 28, 1998.

BACKGROUND OF THE INVENTION

1. Field of the Invention

The invention relates to a reluctance motor with a stator which has a three-phase current stator winding for generating a rotary magnetic field and a rotor which is located on a shaft and which is made primarily of a ferromagnetic material. In particular, the invention relates to such a reluctance motor in which the rotor has a set number of angular regions of the same peripheral angle which adjoin one another in the peripheral direction, preferably having at least one pair of flux guidance regions facing the stator, with flux guidance properties which differ in the main direction of the rotary field.

2. Description of Related Art

Reluctance motors are known from the prior art (compare, for example, Lueger, Lexikon der Technik, vol. 14, Lexikon der Feinwerktechnik, page 315) as independently accelerating synchronous motors. The stator of a conventional reluctance motor is no different from the stator of a conventional synchronous or induction motor which is conventionally operated with three-phase current, as is the conventional reluctance motor. The three-phase current stator winding is designed on a standard basis such that the center plane of each of the coils assigned to one of the three phases lies on the axis of the reluctance motor. In a conventional reluctance motor, as in a synchronous or induction motor, windings with a pole number p greater than two and a number of holes q greater than 1 are allowable.

Typically the three-phase current stator winding of a conventional reluctance motor is made with 4 poles with coils being assigned to each of the three phases and with the coils being distributed in the slots over the entire periphery of the stator; see, for example, S. A. Naser, *Electromechanics and Electric Machines,* John Wiley & Sons, Inc. 1979.

Accordingly, the rotor of the conventional reluctance motor, in four angular regions of the same peripheral angle which adjoin one another in the peripheral direction, has a pair of flux guidance regions facing the stator with flux guidance properties which differ in the main direction of the rotary field. In the conventional reluctance motor, the pairs of flux guidance regions facing the stator are formed with flux guidance properties which differ in the main direction of the rotary field in angular regions of 90° each by the rotor in half of the angular regions, therefore over an angle of 45°, being countersunk. Since the main direction of the rotary field in a block rotor always points in the radial direction of the rotor, the countersinking in the rotor results in flux guidance regions with different magnetic resistances, and therefore, different flux guidance properties.

Conventionally, the rotor of a conventional reluctance motor is made as a squirrel-cage rotor. Therefore, in the operation of a conventional reluctance motor, two torques take effect. In the acceleration range, the conventional reluctance motor develops an asynchronous torque, as a result of the widening of the air gap due to the countersinking in the rotor, the characteristics deteriorate compared to an undamaged rotor of an induction motor. At synchronous rpm, a synchronous so-called reluctance or reaction torque is formed because the rotor, which turns synchronously with the rotary field, tries to assume a position in which the magnetic energy in the air gap is smallest. When the motor is loaded, the rotor would like to remain in this position, it must however lag by a small spacial angle (load angle). The highest torque occurs at a load angle of 90°/p and is called the pull-out torque. Conversely the transition from the asynchronous characteristic to synchronism takes place suddenly as a synchronization process. Whether this dynamic pulling into synchronism is possible depends on the stationary load torque and the moment of inertia to be accelerated.

The existing statements indicate that a conventional reluctance motor runs with a speed of 6000/p rpm. Since, for a plurality of applications, clearly lower rpms are necessary and since the speed of a conventional reluctance motor can be reduced only to a limited degree by increasing the pole number p, to reduce the rpm and/or increase the torque, mechanical gearing and/or electric frequency converters are regularly used. These additional components, on the one hand, increase the production costs of a conventional reluctance motor with low rpm, and on the other hand, adversely affect the efficiency.

One alternative for ensuring low synchronous rpm is represented by the subsynchronous reluctance motor which is, likewise, known from the prior art (compare, for example, Lueger, Lexikon der Technik, vol. 14, Lexikon der Feinwerktechnik, page 315). This subsynchronous reluctance motor is operated single-phase and on its stator in a number of angular regions of the same peripheral angle which adjoin one another in the peripheral direction, a number which corresponds to the number of angular regions on the rotor, has one pair of flux guidance regions facing the rotor with flux guidance properties which differ in the main direction of the rotary field. For the subsynchronous reluctance motor, the flux guidance regions of different flux guidance properties are produced by the countersinking in the stator. As already mentioned, in the subsynchronous reluctance motor, the number of angular regions in the rotor corresponds to the number of angular regions in the stator. The number of angular regions $P_{SL}$ can be chosen independently of the pole number of the stator winding. The rpm of the subsynchronous at reluctance motor is $3000/P_{SL}$ rpm.

The subsynchronous reluctance motor can be used only to a very limited degree, since it must be started to the synchronous rpm and then develops only a synchronous torque which pulsates with twice the main frequency from zero to a maximum. Accordingly, the pull-in torque of the subsynchronous reluctance motor is very small.

In addition to the conventional reluctance motor and the subsynchronous reluctance motor, the electronically switched reluctance motor is known from the prior art (compare, for example, Encyclopaedia Britannica CD 97, "Energy Conversion", "Reluctance Motors"). This electronically switched reluctance motorworks, as the name says, with an electronically switched direct current. The electronically switched direct current magnetizes, at the same, time, two coil windings on the flux guidance areas which are opposite one another in the stator with low magnetic resistance, therefore ferromagnetic poles. The center planes of the two coil windings therefore run tangentially to the block rotor. The numbers of angular regions in the rotor and stator are different in an electronically switched reluctance motor in order to generate a torque which engages the rotor when the direct current is switched from one coil pair to another coil pair. Since the direct current of this type of reluctance motor is electronically switched, theoretically all rpm can be effected for the rotor; of course, here, an electronic control unit is necessary for this purpose. However, such is problematic in the electronically known reluctance motors that only relatively low torques can be transmitted so that additional gearing is necessary to achieve the desired drive torques. In addition, in these motors in the lower rpm range, a rpm fluctuation frequently occurs which is caused by torque fluctuations and which must be corrected by an expensive electronic control.

SUMMARY OF THE INVENTION

Proceeding from the aforementioned prior art, the object of the invention is to make available a reluctance motor which is improved especially with reference to the possibilities of step-down and dynamic pull-in.

In particular, it is an object of the present invention to obtain a reluctance motor which is able to step down the rpm of the rotor without the use of gears or electronic control of the rotating field to do so.

According to the first teaching of the invention, the indicated objects are achieved by the stator, in a stipulated number of angular regions of the same peripheral angle which adjoin one another in the peripheral direction, preferably, having at least one pair of flux guidance regions facing the rotor with flux guidance properties which differ in the main direction of the rotary field, and by the number of angular regions on the stator differing from the number of angular regions on the rotor by an integral multiple of the pole number, preferably the simple pole number, of the three phase current stator winding.

The configuration of the reluctance motor according to a first aspect of the invention ensures stepping down of the rpm of the rotor as compared to the rpm of the rotating field with a simultaneous increase of the nominal torque of the reluctance motor. The synchronous rpm of the reluctance motor configured according to the first aspect of the invention is found as follows:

$$n_x = f \cdot 120 ([w_2 - w_1])/[p \cdot w_2])$$

where $n_x$=synchronous speed in rpm f=frequency of the three-phase current $w_1$=number of angular regions on the stator $w_2$=number of angular regions on the rotor p=number of poles of the three-phase current stator winding The reluctance motor according to this first aspect of the invention easily enables reduction ratios in the range of 1:20 and more, when the torque increases, for example, by a factor of 3 to 5. The reluctance motor according to this first aspect of the invention, therefore, has the properties of a geared motor without gearing being necessary. It allows transmission of large torques with a small structural size, operates with high efficiency, and can be produced with low production engineering cost. The reluctance motor according to the first teaching of the invention has good synchronism properties, and at rest, has a high holding torque when direct current magnetizes the stator winding.

With the reluctance motor according to the first aspect of the invention, as already mentioned, as compared to conventional electric motors, very high torques can be achieved, the motor weight being comparatively small. These high torques are possible by the motor having arrangements with a total of three different "pole numbers", a large number of the existing magnet poles at the same time being magnetically engaged to the magnetic flux guide. Thus, in many cases, a gear reducer can be eliminated since the motors also deliver very high torques even in the range of low rpm. Other important advantages of the reluctance motors according to the first aspect of the invention arise by their having, in comparison with conventional motors, very good smooth running properties in low rpm ranges, and no slippage, regardless of the load and voltage fluctuations. The reluctance motor according to the first teaching of the invention can be operated on the grid and by means of commercial frequency converters (even without return). The motor current changes only little when the motor is loaded or blocked so that the motor cannot be destroyed either in case of overload or in the blocked case.

If the flux guidance regions of different flux guidance properties are formed alternately by air and the ferromagnetic material of the stators and/or rotors, i.e. the flux guidance regions of low magnetic resistance consist of "teeth" of the ferromagnetic material of the stator and/or rotors and the flux guidance regions with high magnetic resistance consist of air gaps between the "teeth" of the stators and/or rotors, both production engineering costs and also the costs for production of flux guidance regions of different flux guidance properties are very low.

A further reduction of production engineering costs is ensured by the fact that, for the case in which the flux guidance regions of low magnetic resistance are formed from the ferromagnetic material of the stator, the number of angular regions of the stator corresponds to the number of slots of the three-phase current stator winding. In this case, the flux guidance regions of low magnetic resistance can be formed directly as an elongation of the flux guidance regions of low magnetic resistance which are present between the slots anyway.

In practice, it has been shown that the reluctance motor according to the first aspect of the invention has especially good properties with respect to the rated torque and synchronizing properties, if the three-phase current stator winding is made with 2 or 4 poles.

Furthermore, it has been found in practice that the properties of the reluctance motor according to the first aspect of the invention are improved with respect to the rated torque and synchronizing properties for the case in which the number of angular regions on the stator and rotor is clearly greater, preferably by a factor of at least 5, than the pole number of the three-phase current stator winding.

To increase the rated torque, it is furthermore advantageous if the widths of the flux guidance regions with different flux guidance properties on the component with the highest number of angular regions essentially agree, and at the same time, the widths of the flux guidance regions formed by ferromagnetic material on the remaining components corresponds to the widths on the component with the largest number of angular regions.

If the stator and rotor each have at least one other layer of the flux guidance region pairs with flux guidance properties which differ alternately in the main direction of the rotary field and the layers of the stators and rotors follow one another in alternation, a clear increase of the rated torque of the reluctance motor according to the first aspect of the invention is ensured. This can be easily substantiated by the fact that the magnetic forces for the described configuration of the reluctance motor according to the first aspect of the invention are applied to twice the number of flux guidance elements with low magnetic resistance.

An optimum ratio between the rated torque and material cost for the flux guidance regions is obtained when, on the one hand, it is ensured that the flux guidance regions of one layer of the stator or rotor, which are made of a ferromagnetic material and which lie between two other layers of the stator or rotor, are roughly as high as wide in the main direction of the rotary field, and/or on the other hand, it is ensured that the flux guidance regions of the stator or rotor which are located in the immediate vicinity of the return elements of the stators or rotors and which are made of ferromagnetic material are roughly half as high as wide in the main direction of the rotary field.

Since the forces which tend to keep the magnetic energy low in the air gap of the reluctance motor are applied to the flux guidance regions of low magnetic resistance of the rotor, for the same size, it is advantageous to form the rotor as an external rotor since, in this case, the attacking forces apply a higher torque as a result of the better lever ratio.

As alternative to the configuration of the flux guidance regions of different flux guidance properties by air and ferromagnetic material, it is possible to form the flux guidance regions of different flux guidance properties by permanent magnets which are located either on the stator or rotor and which are polarized oppositely in the main direction of the rotary field. This configuration of the flux guidance regions, for otherwise the same geometrical design, increases the rated-load torque of the reluctance motor according to the first aspect of the invention, but at the same time causes higher production costs.

A reluctance motor according to the first aspect of the invention in which the flux guidance regions of different flux guidance properties are formed either on the stator or on the rotor by permanent magnets which are polarized oppositely in the main direction of the rotary field, with respect to its rated-load torque and its synchronizing properties, behaves optimally when the difference of the number of angular regions on the stator and rotor corresponds to an integral multiple of the number of pole pairs, preferably, the simple pole pair number, of the three-phase current stator winding. In practice, this means that a four-pole reluctance motor according to the first aspect of the invention in which there are permanent magnets on the stator or rotor behaves optimally when the difference of the number of angular regions on the stator and rotor is two. With this difference, a 4-pole reluctance motor according to the first aspect of the invention, in which the flux guidance regions of different flux guidance properties on the stator and rotor are formed by air and ferromagnetic material, is not serviceable.

A reluctance motor according to the first aspect of the invention in which the flux guidance regions of different flux guidance properties are formed by permanent magnets which are located either on the stator or on the rotor and which are poled oppositely in the main direction of the rotary field behaves differently also with respect to the optimum ratio of rated-load torque and material cost. An optimum ratio between the rated-load torque and material cost is ensured in a reluctance motor configured in this way by the ferromagnetic flux guidance regions which are located in the immediate vicinity of the return elements of the stators or rotors, which are assigned the flux guidance regions being formed by permanent magnets on the rotor or stator which are polarized oppositely in the main direction of the rotary field being roughly as high as wide in the main direction of the rotary field.

The reduction ratios which can be achieved with the single-stage gear reduction described so far are, in fact, upwardly limited by the fact that the optionally large numbers of angular regions on the stators and rotors, on the one hand, cannot be easily accomplished, and on the other, become problematic with respect to the size of the rated-load torque. Higher reduction ratios are accordingly made available according to another arrangement of the first aspect of the invention by a reduction rotor floating on the shaft being located between the stator and rotor, by the reduction rotor on its surface facing the stator in a preset number of angular regions of the same peripheral angle which adjoin one another in the peripheral direction, each having preferably a pair of flux guidance regions with flux guidance properties which differ in the main direction of the rotary field, by the reduction rotor on its surface facing the rotor in a stipulated number of angular regions of the same peripheral angle which adjoin one another in the peripheral direction, each having preferably a pair of flux guidance regions with flux guidance properties which differ in the main direction of the rotary field, and by the difference of the number of angular regions on the stator and the number of angular regions on the surface of the reduction rotor facing the stator corresponding to the difference of the number of angular regions on the surface of the reduction rotor facing the rotor and the number of angular regions on the rotor and to an integral multiple of the pole number, preferably the simple pole number, of the three-phase current stator winding. The reduction rotor configured as above ensures that, in spite of high frequencies of the stator current, the reluctance motor turns very slowly and uniformly. The described configuration furthermore ensures that the rotor joined to the shaft has a very low effective moment of inertia.

According to a second aspect of the invention, the above objects are achieved by the rotor encompassing the flux guidance regions and the connecting elements for connection to the shaft and by there being a flux guidance rotor which floats on the shaft and which consists of ferromagnetic material for return of the lines of force of the rotary field. This second aspect of the invention can be accomplished alternatively or cumulatively, i.e., separately or in conjunction, with the first aspect of the invention.

The moment of inertia of the rotor can be significantly reduced by the separation of the functions of accommodating the torque and return of the lines of force which is provided according to the second aspect of the invention. Thus, the dynamic pulling of the reluctance motor into synchronism is facilitated. In steady-state operation, the flux guidance rotor then assumes a speed in the vicinity of the synchronous rpm of the rotor so that eddy-current losses are reduced.

Since, in particular rotors made as internal rotors have a high moment of inertia, the second aspect of the invention is advantageously arranged such that the internal rotor is made as a hollow cylinder and that, within the internal rotor, there is a ferromagnetic material flux guidance rotor made as a solid cylinder and supported to float on the motor shaft.

An improvement in the asynchronous starting of a reluctance motor according to the invention is ensured by the bars of a squirrel-cage damper winding running in recesses in the ferromagnetic material to form the rotor flux guidance regions of air. This measure yields a similar arrangement as is known for conventional squirrel-cage rotors of induction motors.

To reduce eddy-current losses, the flux guidance regions made of ferromagnetic material are advantageously built up from electric steel sheets which are insulated from one another.

A positive effect on the operating and noise behavior of the reluctance motor in accordance with the invention is ensured by the flux guidance regions in the stator and/or in the rotor running being inclined in the direction of rotation.

A more uniform behavior of the rated torque is guaranteed by this inclination of the flux guidance regions.

Especially for the case in which the reluctance motor of the invention is to have a short structural length, is it advantageous if the stator and rotor include a radial air gap, the reluctance motor is therefore made as a disk-type rotor.

Finally, another advantageous configuration of the reluctance motor in accordance with the invention is achieved by the provision of a transducer or a resolver on the shaft. Using this transducer or resolver, a control unit controls a frequency converter such that loss of synchronism of the reluctance motor of the invention is prevented under load so that, as a result, for the reluctance motor of the invention, a characteristic similar to that of a de motor results.

In particular, there is now a plurality of possibilities for configuring and developing the reluctance motor as of the invention.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1A:
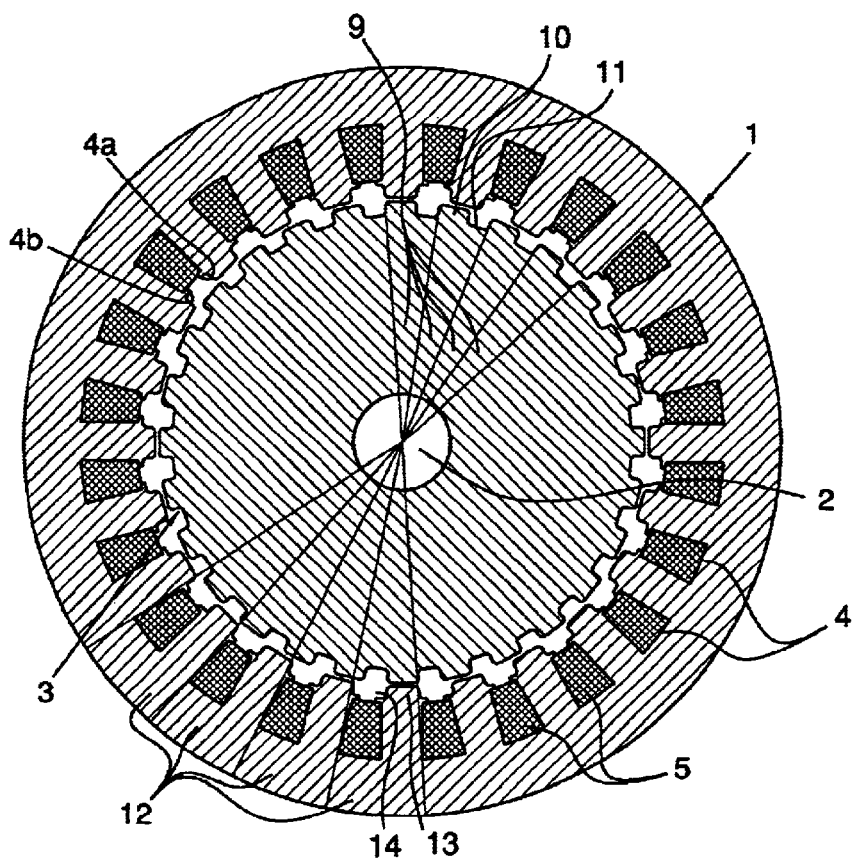
FIGS. 1a) & 1b) show a first embodiment of a reluctance motor according to the first aspect of the invention in a section taken transversely to the shaft axis and a section along the shaft axis, respectively.
Figure 1B:
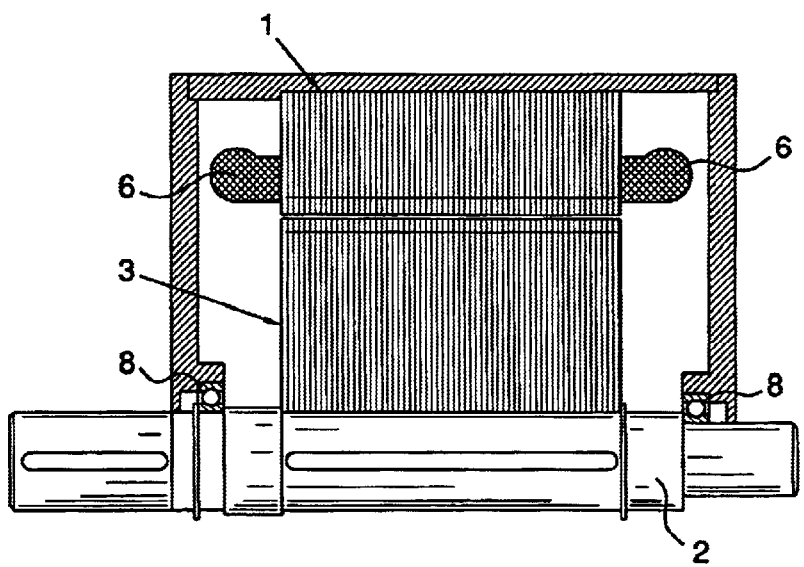

FIGS. 1a) & 1b) show a first embodiment of a reluctance motor in accordance with the above-described first aspect of the invention. The first embodiment shown has a stator 1, which has a three-phase current stator winding for generating a rotary magnetic field, and a rotor 3 which is located on a shaft 2 and which is made of a ferromagnetic material. The three-phase current stator winding of stator 1 is a 4-pole winding with two holes, i.e., two slots per pole and phase, so that there are twenty-four slots 4 in the stator for holding the three-phase current stator winding which are partially closed by circumferential projections 4a and 4b. Accordingly, FIG. 1a) shows the individual coil windings 5 of a three-phase current stator winding in cross section. FIG. 1b) conversely shows, in section, only winding overhangs 6 of the three-phase current stator winding.

FIG. 1b) shows shaft 2 connected to stator 1 so that they rotate as a unit together, the shaft 2 being pivotally mounted in housing 7 via bearings 8.

The version of rotor 3 shown in FIG. 1a) corresponds in principle, except for the number of angular regions 9, to the rotors of conventional reluctance motors which are known from the prior art. Rotor 3 has twenty-eight angular regions 9 of the same peripheral angle which adjoin one another in the circumferential direction and which define a pair of flux guidance regions 10, 11 that face the stator 1 and have flux guidance properties which differ in the principal direction of the rotary field. It should be pointed out here that it is advantageous in a reluctance motor according to the first aspect of the invention if the ferromagnetic material of rotor 3 is as magnetically weak as possible, i.e., has a coercive field strength as low as possible, since flux guidance regions 10, in contrast to the flux guidance regions of conventional reluctance motors, are regularly plugged. A high coercive field strength would lead to high eddy-current losses in rotor 3.

According to the first aspect of the invention, stator 1 is provided with twenty four-angular regions 12 of the same peripheral angles which adjoin one another in the circumferential direction, like rotor 3, each of which is formed with a pair of flux guidance regions 13, 14 that face rotor 3 and have flux guidance properties which differ in the principal direction of the rotary field.

Flux guidance regions 10, 11 on rotor 3 extend, like flux guidance regions 13, 14 on stator 1, as illustrated in FIG. 1b), over the entire axial length of stator 1 and rotor 3.

Theoretically, it is also possible for flux guidance regions 12, 13 on stator 1 and/or flux guidance regions 10, 11 on rotor 3 to not extend over the entire axial length of stator 1 and rotor 3. It is also theoretically conceivable some of the angular regions 9 of rotor 3 or angular regions 12 of stator 1 not to have pairs of flux guidance regions with flux guidance properties which differ in the main direction of the rotary field. However, these theoretically possible changes, relative to the first embodiment of a reluctance motor according to the first embodiment of the invention showed in FIGS. 1a) & 1b), lead only to a deterioration of function.

In the first embodiment of a reluctance motor according to the first embodiment of the invention showed in FIGS. 1a) & 1b), flux guidance regions 10, 13 of low magnetic resistance are made of punched ferromagnetic material of stator 1 and rotor 3. Alternatively, it is, likewise, conceivable, for the flux guidance regions 13 of low magnetic resistance of stator 1 to be cemented in. This cementing also enables refitting of existing stators for use in conjunction with a reluctance motor according to the first aspect of the invention. Punching of flux guidance regions 13 with low magnetic resistance of the ferromagnetic material of the stator in the first embodiment shown in FIGS. 1*a*) & 1*b*) is especially practicable since the number of angular regions 12 of stator 1 corresponds to the number of slots 4 of the three-phase current stator winding.

In the first embodiment shown in FIG. 1, both the number of angular regions 9, 12 on stators 1 and rotors 3 is clearly greater than the pole number of the three-phase current stator winding, and the widths of flux guidance regions 10, 11 on rotor 3 as the component with the largest number of angular regions 9 essentially agree and the widths of the flux guidance regions formed by ferromagnetic material on stator 1 as the remaining component correspond to the widths on rotor 3 as the component with the largest number of angular regions 9. To this extent, the first embodiment optimized with respect to the rated-load torque and synchronizing properties. The latter described advantageous embodiments of a reluctance motor according to the first teaching of the invention are only incompletely satisfied or not at all by the second embodiment of a reluctance motor shown in FIGS. 2*a*) & 2*b*). Nevertheless the second embodiment shown in FIGS. 2*a*) & 2*b*) is easily serviceable.

In 2*a*) & 2*b*), and in the following figures, all components which correspond to those of the first embodiment are labeled with the same reference numbers as in FIGS. 1*a*) & 1*b*).

Figure 2A:
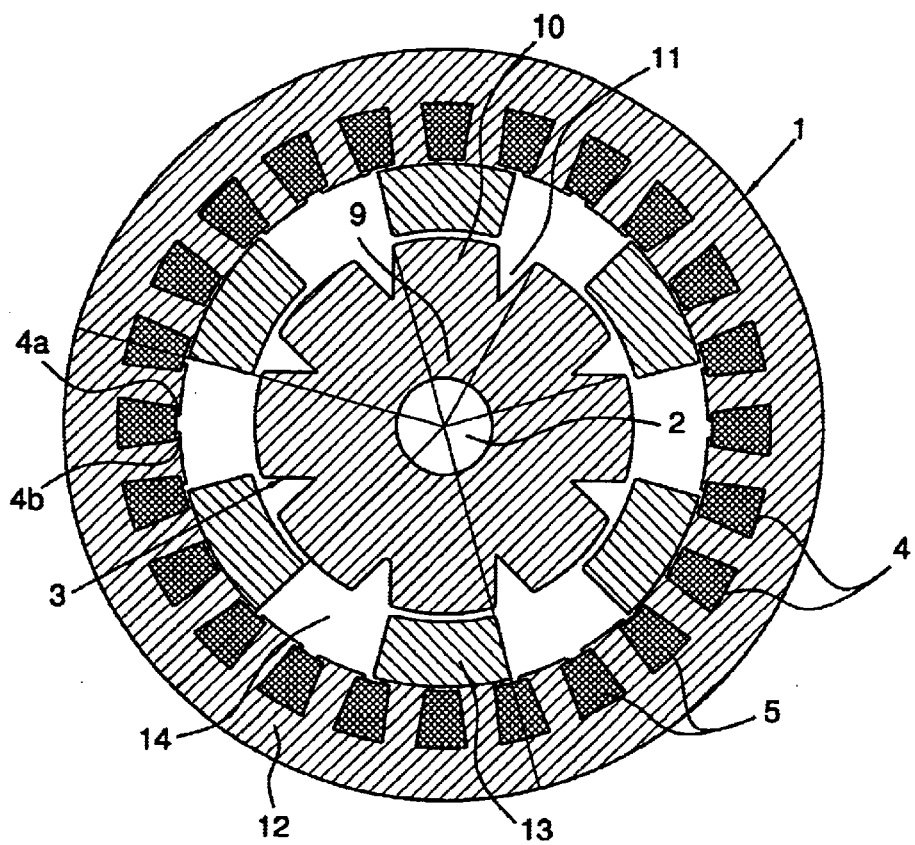
FIGS. 2a) & 2b) show a second embodiment of a reluctance motor according to the first aspect of the invention in a section transversely to the shaft axis and a section along the shaft axis, respectively.
Figure 2B:
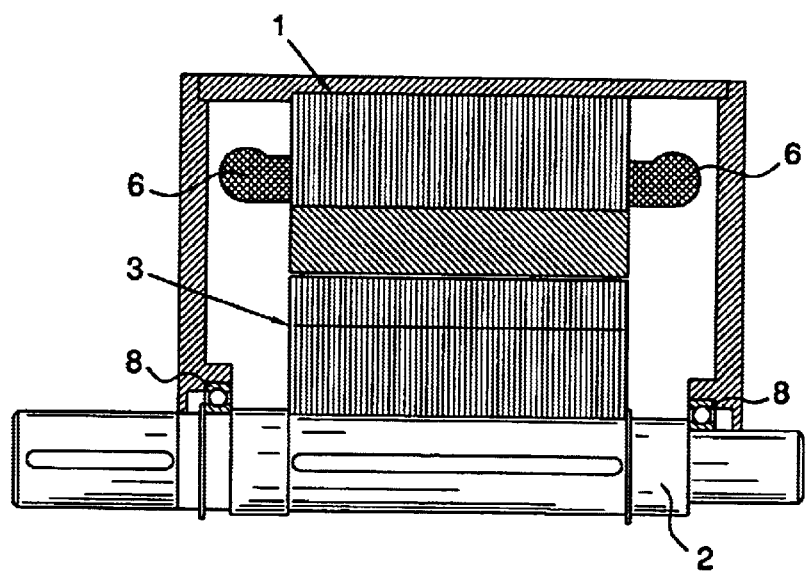

The three-phase current stator winding is made as a 2-pole winding with four holes in the second embodiment shown in FIGS. 2*a*) & 2*b*). As can be easily recognized, the number of angular regions 9 on rotor 3 is equal to eight, while the number of angular regions 12 on stator 1 is equal to 6. Thus, for the second embodiment, the reduction ratio is 1:4. Conversely the reduction ratio in the first embodiment is 1:14.

The second embodiment of a reluctance motor according to the first teaching of the invention shown in FIGS. 2*a*) & 2*b*) is especially suitable for refitting existing motors, since flux guidance regions 13 of ferromagnetic material, as a result of their size, can be especially easily cemented into an existing stator 1.

Since, both in the first and second embodiment, the number of angular regions 9 on rotor 3 is greater than the number of angular regions 12 on stator 1, in both cases, rotor 3 turns in the direction of the rotary magnetic field. For the reverse case, therefore, the number of angular regions 9 on rotor 3 is less than the number of angular regions 12 on stator 1 as, for example, in the third embodiment shown in FIGS. 3*a* & 3*b*), rotor 3 turns against the direction of the rotary magnetic field.

Figure 3A:
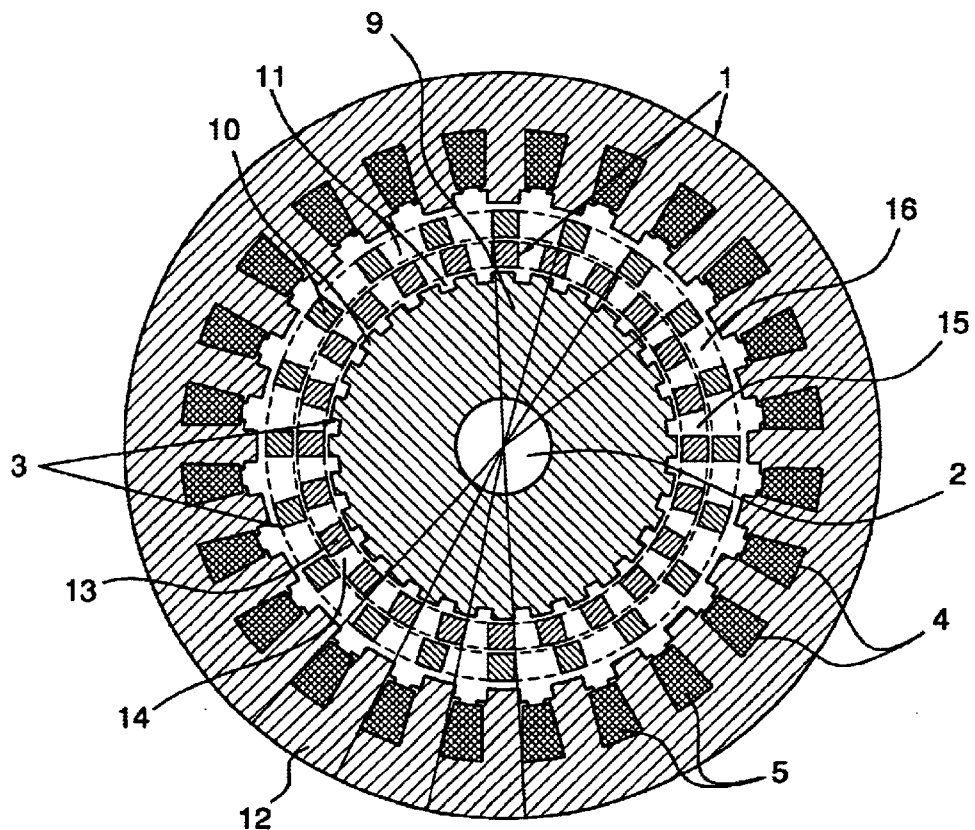
FIGS. 3a) & 3b) are views similar to those of FIGS. 1a), 2a), and 1b), 2b) respectively, but showing a third embodiment of a reluctance motor according to the first aspect of the invention.

The three-phase current stator winding of the third embodiment, shown in FIGS. 3*a*) & 3*b*), corresponds to the three-phase current stator winding of the first embodiment shown in FIGS. 1*a*) & 1*b*). As is easily apparent, rotor 3 of the third embodiment has twenty angular regions 9, while stator 1 of the third embodiment has twenty-four angular regions 12. Thus the reduction ratio is 1:10, rotor 3 turning against the direction of the rotary magnetic field.

In addition, in the third embodiment shown in FIGS. 3*a*) & 3*b*), stator 1 and rotor 3 each have a second layer 15, 16 of flux guidance region pairs with flux guidance properties which differ alternately in the main direction of the rotary field, the layers following one another alternately in succession. In the third embodiment, therefore, in each angular region 12, 19 of stator 1 and rotor 3 there are two pairs of flux guidance regions with flux guidance properties which differ in the main direction of the rotary field on different radii. Thus, since the forces which are applied to flux guidance regions 10 of rotor 3 of ferromagnetic material by the magnetic field attenuated as a result of the additional air gap are applied almost twice, the rated-load torque of the reluctance motor according to the first aspect of the invention is clearly increased by the described measure.

Figure 3B:
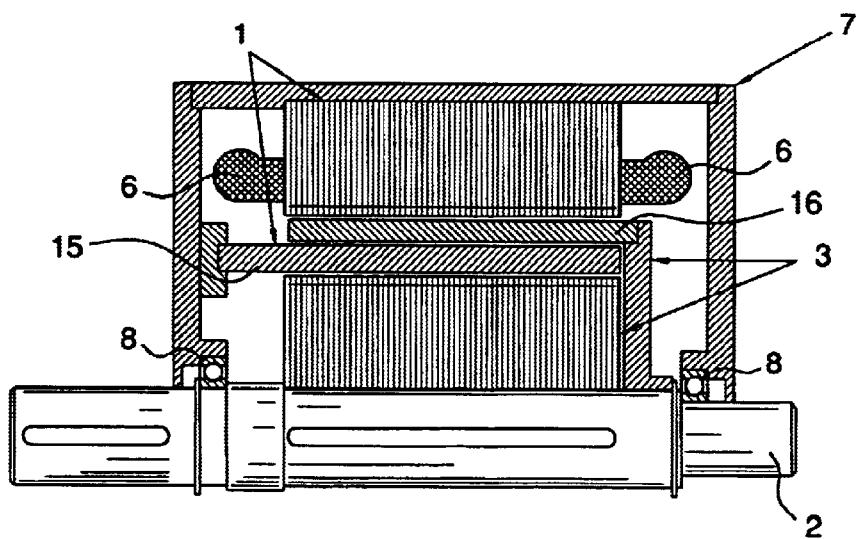

One manner of attachment of layer 15 of stator 1 to housing 7 is shown in FIG. 3*b*). FIG. 3*b*) likewise shows a manner of attachment of layer 16 of rotor 3 on shaft 2. In FIG. 3*b*), it is, finally, also apparent that layers 15, 16 extend over the entire axial length of stator 1 and rotor 3.

Following the practical findings on the optimum ratio of the torque obtained to the material cost, flux guidance regions 10, 13 which are made of ferromagnetic material and which are located between two other layers of stator 1 or rotor 3 are almost as high as wide in the main direction of the rotary field. Here, flux guidance regions 10, 11, 13, 14 located directly on stator 1 or rotor 3 are likewise called layers. For these flux guidance regions 13, 10 of stator 1 and rotor 3 which are located in the immediate vicinity of the return elements of stator 1 or rotor 3 and which likewise are made of ferromagnetic material, in the third embodiment, it holds that they are roughly half as high as wide in the main direction of the rotary field. For this ratio, it applies to flux guidance regions 13, 10 which are located in the immediate vicinity of the return elements of stator 1 or rotor 3 that the ratio of the rated-load torque to material cost is optimized.

Figure 4A:
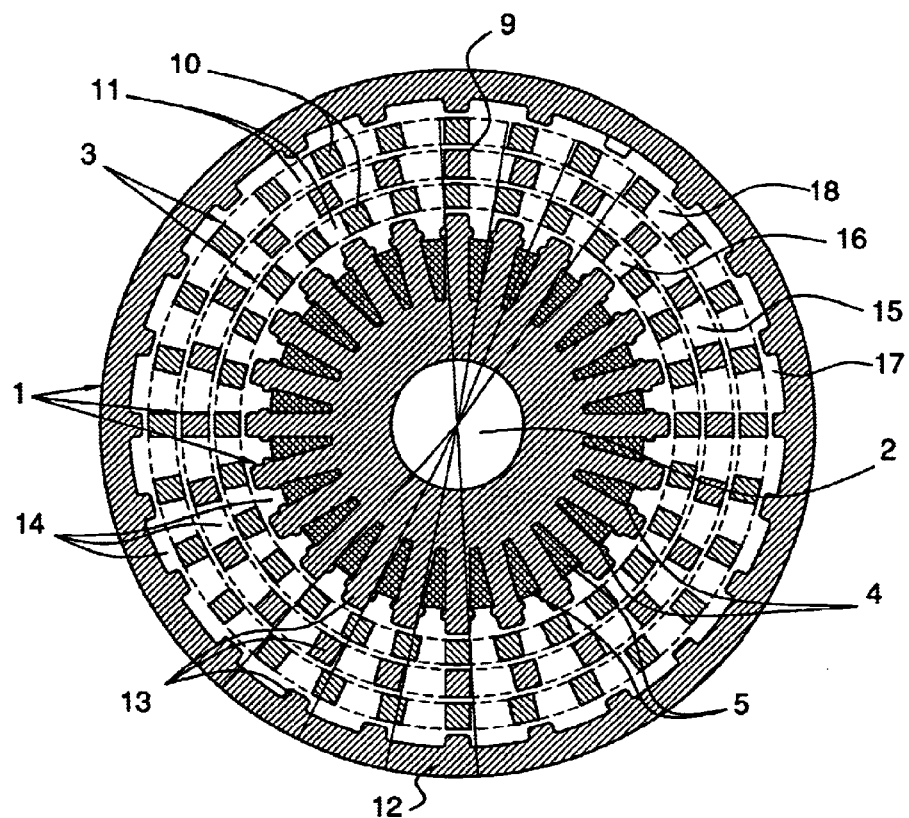
FIGS. 4a) & 4b) show a fourth embodiment of a reluctance motor according to the first aspect of the invention in a section transversely to the shaft axis and a section along the shaft axis, receptively.

From the aforementioned fact that magnetic forces are applied to the flux guidance regions of ferromagnetic material, it follows that, to maximize the rated torque, it is a good idea to form the rotor as an external rotor. A fourth embodiment of a reluctance motor according to the first aspect of the invention, in which rotor 3 is made as an external rotor, is shown in FIGS. 4*a* & 4*b*).

In the fourth embodiment, stator 1 consists of a known internal stator with a 4-pole three-phase current stator winding with two holes q=2, there being flux guidance regions 13 made of ferromagnetic material between slots 4. In addition, the stator 1 has two additional layers 15, 17 of flux guidance region pairs. In the fourth embodiment rotor 3 consists of two layers 16, 18 of flux guidance region pairs. In this fourth embodiment, therefore, rotor 3 has no return elements for the rotary magnetic field. The return elements are formed only by stator 1. Accordingly, the moment of inertia of rotor 3 is reduced; this facilitates dynamic pulling into synchronism of the reluctance motor according to the first aspect of the invention.

The reduction ratio of the fourth embodiment of a reluctance motor according to the first aspect of the invention is 1:14, and thus, agrees with the transmission ratio of the first embodiment. This results from the likewise coinciding numbers of angular regions 12, 9 in stator 1 and rotor 3.

Figure 4B:
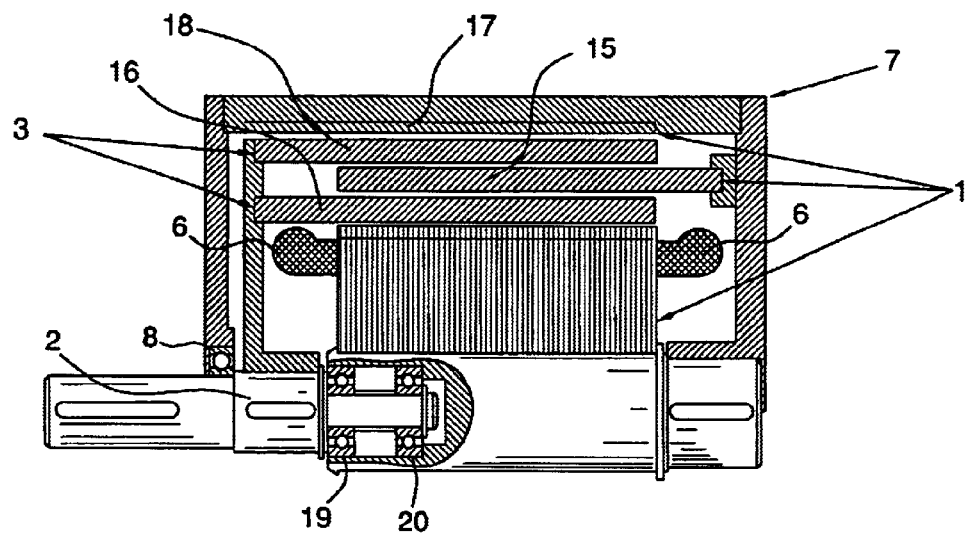

FIG. 4*b*) shows how one possible manner of attachment of rotor 3 on shaft 2 can look. Shaft 2, here, is pivotally mounted opposite stator via additional bearings 19, 20.

Figure 5A:
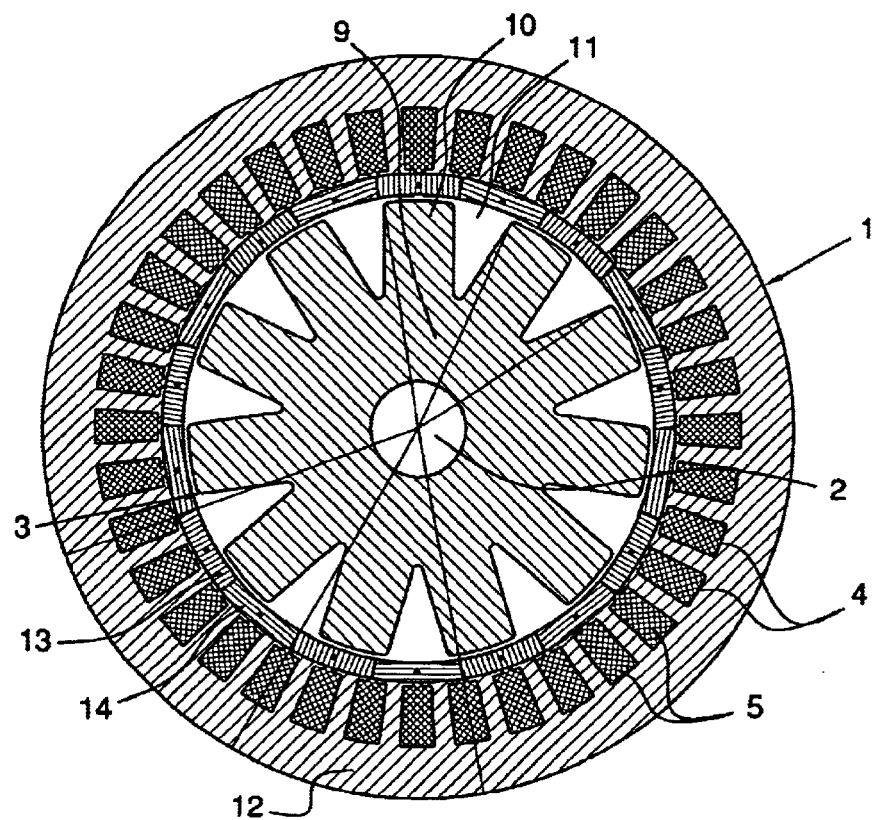
FIGS. 5a) & 5b) show a fifth embodiment of a reluctance motor according to the first aspect of the invention in a section transversely to the shaft axis and a section along the shaft axis, respectively.
Figure 5B:
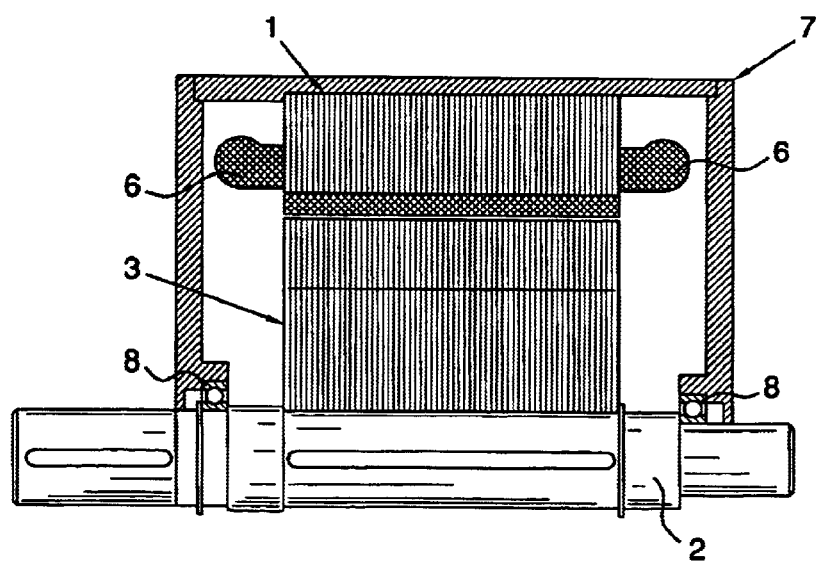

In the fifth embodiment of a reluctance motor according to the first aspect of the invention shown in FIGS. 5*a*) & 5*b*), flux guidance regions 13, 14 of different flux guidance properties on stator 1, in contrast to the embodiments described so far, is made of permanent magnets that are oppositely polarized in the main direction of the rotary field. The opposite polarization of the permanent magnets is shown in FIG. 5a) by different crosshatching and arrows which indicate the direction of the lines of force and which run in the opposite directions.

For a reluctance motor made in this way, it now holds that optimum operation is ensured when the difference of the number of angular regions 12, 9 in stator 1 and rotor 3 corresponds to an integral multiple of the number of pole pairs, preferably the simple pole pair number, of the three-phase current stator winding. In the fifth embodiment shown, stator 1 is formed of a 4-pole three-phase current stator winding with three holes. The number of angular regions 12 on stator 1 is now nine, while the number of angular regions 9 on rotor 3 is a total of eleven. The fifth embodiment shown in FIGS. 5a) & 5b), therefore, with reference to the difference between the number of angular regions 12, 9 on stator 1 and rotor 3, is an optimum example, since the difference corresponds to the simple pole pair number, here two. The reduction ratio of the fifth embodiment is 1:11 and follows from the formula set forth in the Summary portion of this specification.

FIG. 5a) clearly shows that flux guidance regions 10 which are located in the immediate vicinity of the return elements of rotor 3 and which are made of ferromagnetic material are roughly as high as wide in the main direction of the rotary field. It has been found in practice that this height/width ratio for flux guidance regions which made of ferromagnetic material and which are opposite flux guidance regions made of permanent magnetic material represents the optimum ratio of the rated-load torque and material cost.

The formation of the flux guidance regions from permanent magnets which is done in the fifth embodiment is advantageous in that, with the same stator periphery, it ensures a higher rated-load torque, and at the same time, relatively easy retrofitting of a stator of a conventional synchronous or induction motor is possible.

Figure 6A:
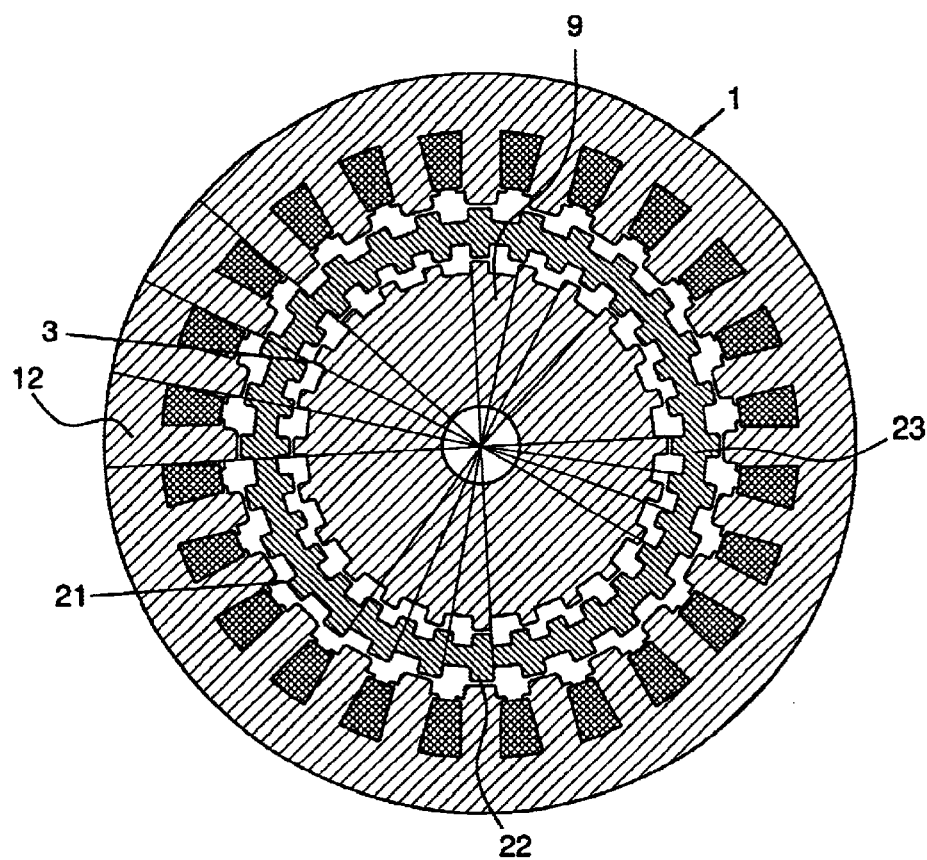
FIGS. 6a) & 6b) are views similar to those of FIGS. 4a), 5a), and 4b), 5b) respectively, but showing a sixth embodiment of a reluctance motor according to the first aspect of the invention in a section transversely to the shaft axis and a section along the shaft axis.

FIG. 6 of the drawings show a sixth embodiment of a reluctance motor according to the first aspect of the invention in which there is reduction rotor 21 floating on shaft 2 between stator 1 and rotor 3. In this embodiment, rotor 3 has twenty eight angular regions 9, stator 1 has twenty four angular regions 12, the surface of reduction rotor 21 facing stator 1 has twenty eight angular regions 22, and the surface facing rotor 3 has thirty two angular regions 23. Thus, the difference between the number of angular regions 12 on stator 1 and the number of angular regions 22 on the surface of reduction rotor 21 facing stator 1 agrees with the difference of the number of angular regions 23 on the surface of reduction rotor 21 facing rotor 3 and the number of angular regions 9 on rotor 3 and the pole number of the three-phase current stator winding.

Figure 6B:
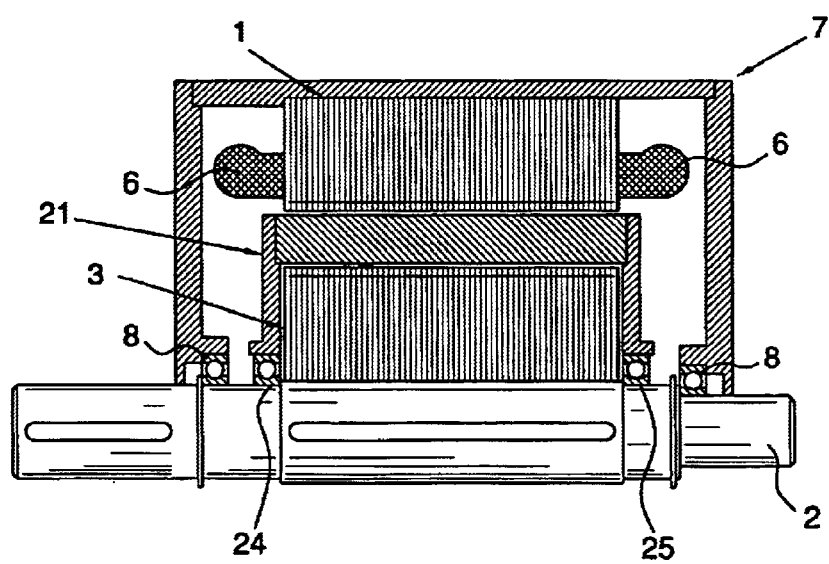

FIG. 6b) shows one possible version of the floating of reduction rotor 21 on shaft 2 via additional bearings 24, 25. An arrangement of two reduction rotors for extremely high reduction ratios is also feasible.

Figure 7A:
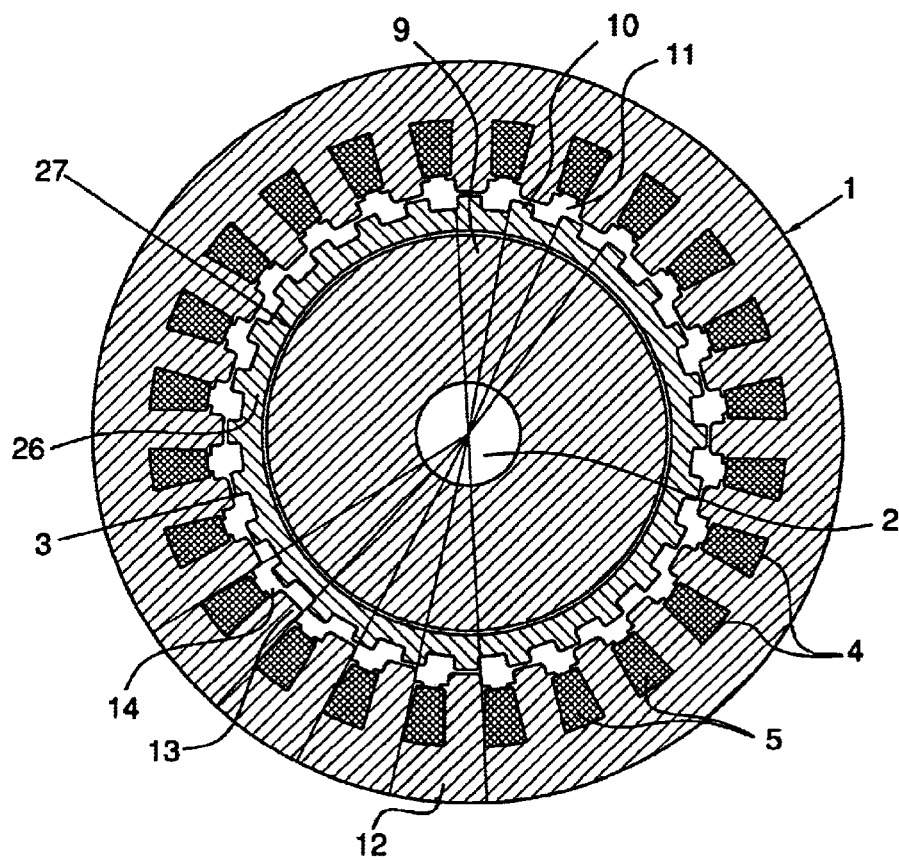
FIGS. 7a) & 7b) show a first embodiment of a reluctance motor according to the second aspect of the invention in a section transversely to the shaft axis and a section along the shaft axis, respectively.
Figure 7B:
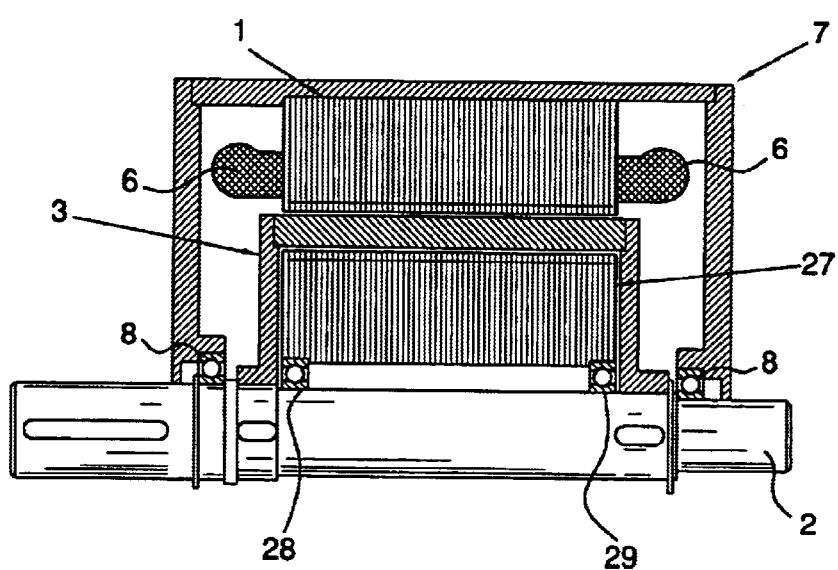

FIGS. 7a) & 7b) show an embodiment of a reluctance motor according to the second aspect of the invention and in which the first aspect of the invention is accomplished at the same time. According to the second aspect of the invention, rotor 3 of this embodiment is made as an internal rotor having flux guidance regions 10, 11 and, a cylinder jacket 26 as a connecting element for connection to shaft 2. At the same time, according to the second aspect of the invention, on shaft 2 there are flux guidance rotor 27 of ferromagnetic material for return of the lines of force of the rotary magnetic field. Flux guidance rotor 27 is accordingly made as a solid cylinder. One possibility for connection of rotor 3, made as a hollow cylinder, for rotation with the shaft 2 and for floating bearing of flux guidance rotor 27 on shaft 2 is apparent from FIG. 7b). In this case, flux guidance rotor 27 is supported on shaft 2 via additional bearings 28, 29.

The remaining configuration of the embodiment of the reluctance motor shown in FIGS. 7a) & 7b) according to the second aspect of the invention corresponds with respect to the three-phase current stator winding and the number of angular regions 12, 9 on stator 1 and rotor 3 to the first embodiment shown in FIGS. 1a) & 1b). Accordingly, the reduction ratio also coincides. The difference between the embodiment shown in FIGS. 7a & 7b) according to the second aspect of the invention and the first embodiment shown in FIGS. 1a & 1b) according to the first aspect of the invention thus lies solely in the reduced moment of inertia of rotor 3 which improves the dynamic falling of rotor 3 into synchronism.

Figure 8:
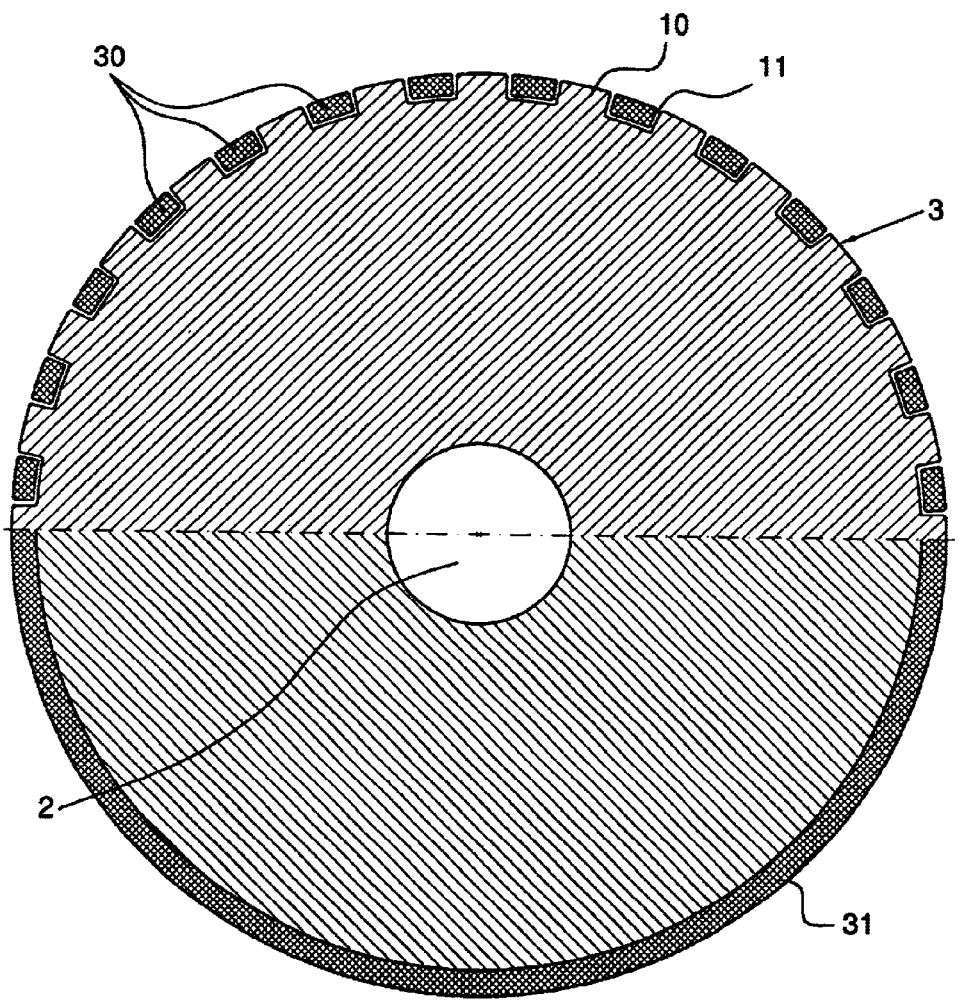
FIG. 8 shows a first embodiment of a rotor of a reluctance motor according to the first aspect of the invention in a section transversely to the shaft axis.

The section, which is shown in FIG. 8, through one embodiment of rotor 3, transversely to the longitudinal axis of shaft 2, shows bars 30 of a squirrel-cage damper winding located here on rotor 3 in its upper half in the recesses in the ferromagnetic material for formation of flux guidance regions 11 of rotor 3 which as regions of low magnetic permeability. In the lower half of FIG. 8, conversely, a short circuiting ring 31 is shown which is conventionally located on the axial ends of rotor 3 and which short circuits bars 30 of the squirrel cage damper winding. Since bars 30 of the squirrel-cage damper winding have a much higher magnetic resistance than the ferromagnetic flux guidance regions 10, the function of a reluctance motor of the invention is only insignificantly impaired in synchronous running by the depicted arrangement of a squirrel cage damper winding.

Figure 9:
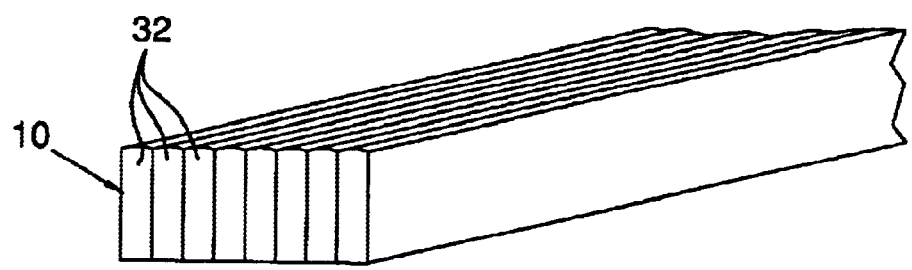
FIG. 9 shows enlarged a section of a flux guidance region of a reluctance motor according to the invention.

FIG. 9 shows, detached from a specific embodiment, a flux guidance region 10, 13 made of ferromagnetic material and which is built up from electric steel sheets 32 that are electrically insulated relative one another. To reduce eddy-current losses, the contact planes of electric steel sheets 22 lie in the main direction of the rotary magnetic field.

Figure 10:
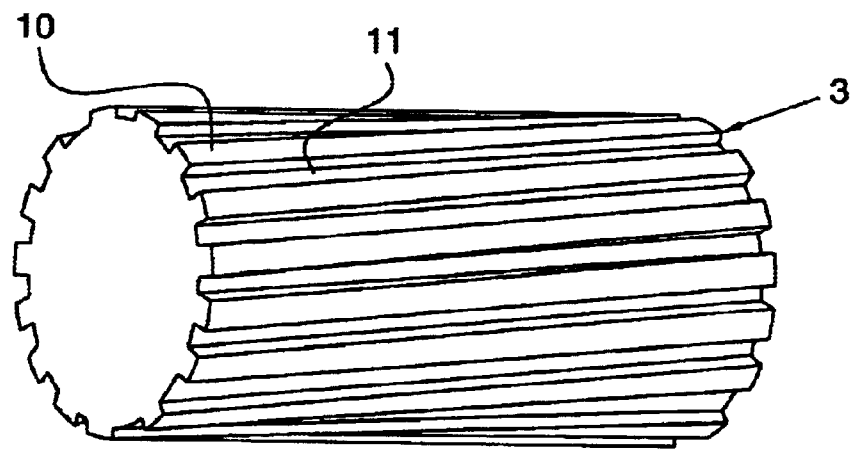
FIG. 10 shows an embodiment of a rotor of a reluctance motor according to the first aspect of the invention in a perspective view.

An embodiment of rotor 3, in which flux guidance regions 10, 11 run inclined in the direction of rotation, is shown in FIG. 10.

Figure 11A:
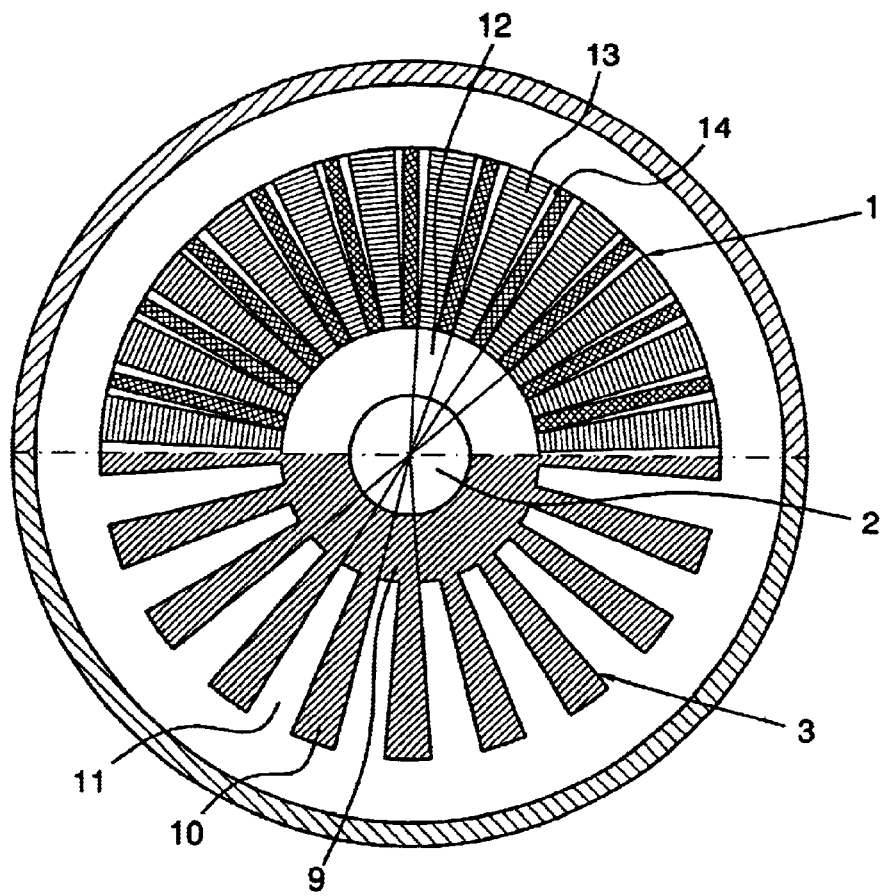
FIGS. 11a) & 11b) show a seventh embodiment of a reluctance motor according to the first aspect of the invention in a section transversely to the shaft axis and a section along the shaft axis, respectively.

FIGS. 11a) & 11b) show a seventh embodiment of a reluctance motor according to the first aspect of the invention in which stator 1 and rotor 3 include a radially extending air gap. This embodiment is, therefore, a so-called disk-type rotor.

In the disk-type rotor shown in FIGS. 11a) & 11b), the three-phase current stator winding has 4 poles with two holes, as is apparent from the upper half of FIG. 11a). It is furthermore apparent from this upper half that the number of angular regions 12 on stator 1 is twenty-four. Additionally, it is apparent from the partial view of rotor 3 shown in the lower half of FIG. 11a) that the number of angular regions 9 on rotor 3 is twenty. Accordingly the reduction ratio of the seventh embodiment shown in FIGS. 11a) & 11b) is 1:10.

Figure 11B:
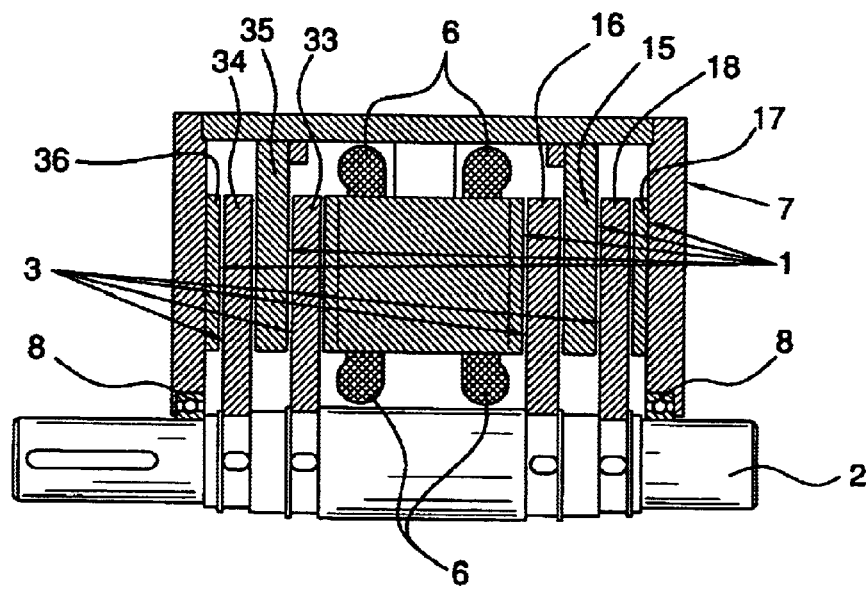

FIG. 11b) shows that, in the seventh embodiment of a reluctance motor according to the first aspect of the invention, rotor 3 is formed of a total of four layers 16, 18, 33, 34. Accordingly, the stator 1, without counting the three-phase current stator winding, has four layers 15, 17, 35, 36. The number of layers and arrangement of the seventh embodiment is comparable to the fourth embodiment shown in FIGS. 4a) & 4b) except for the symmetrical doubling.

Figure 12A:
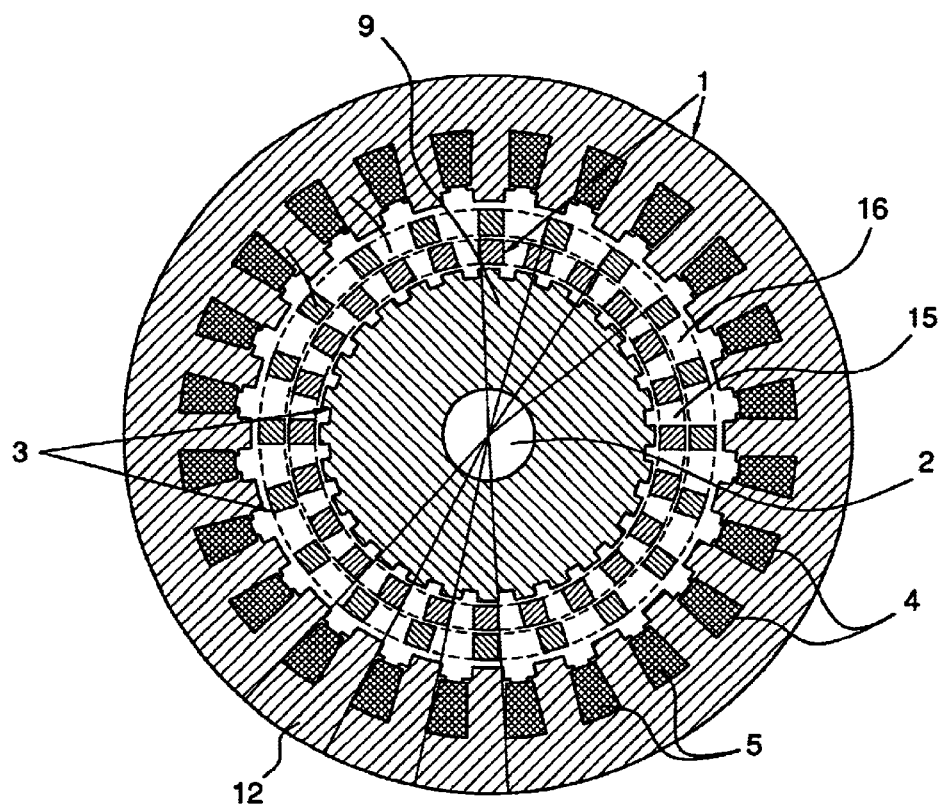
FIGS. 12a) & 12b) show an eighth embodiment of a reluctance motor according to the first aspect of the invention in a section transversely to the shaft axis and a section along the shaft axis.
Figure 12B:
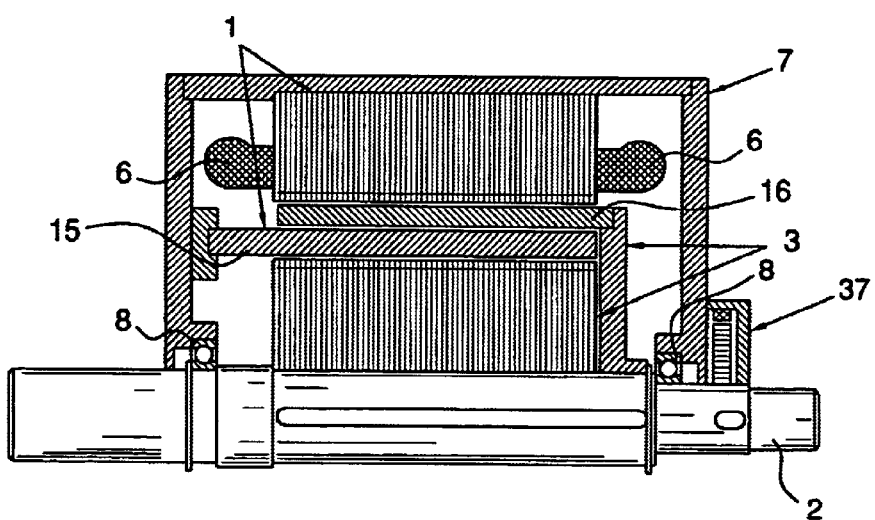

The eighth embodiment of a reluctance motor according to the first aspect of the invention shown in FIGS. 12a) & 12b) corresponds in its structure, first of all, entirely to the third embodiment shown in FIGS. 3a) & 3b). The sole difference between these two embodiments being the addition of a transducer or resolver 37 between shaft 2 and housing 7 in the eighth embodiment as compared to the third embodiment. The transducer or resolver 37 enables determination of the loading of the reluctance motor from the phase shift between the rotor and rotary magnetic field. From the known load on the reluctance motor, then a control unit (not shown) determines the necessary frequency change of the rotary field which is ensured via a frequency converter (which is also not shown). With suitable activation, thus, a characteristic of the reluctance motor according to the first aspect of the invention results which corresponds to a dc motor.

From the foregoing it should now be apparent how the present invention enables a reluctance motor to obtain that achieves a gearless step-down without electronic control of rotating field, producing a reluctance motor in which stepping down of the rpm of the rotor is obtained with the high torque, low slippage properties of a geared motor but without gearing being necessary. Furthermore, it has also been shown how, alternately or in conjunction with the preceding aspect, the invention also enables a reluctance motor to be achieved which has the properties of a dc reluctance motor that is electronically switched to obtain changes in rpm without having to use an electronic control unit to electronically control the rotating field to do so without rpm fluctuations and without suffering from the relatively low torques associated with such motors.

I claim:

1. Reluctance motor with a stator comprising a three-phase current stator winding with a number of poles for generating a rotary magnetic field without electronic switching and with a number of slots per pole and phase that is greater than 1, coils being assigned to each of the three phases with the coils being distributed in the slots of the stator and a rotor which is located on a shaft and is made primarily of a ferromagnetic material, the rotor having a predetermined number of angular regions of a like peripheral angular extent which adjoin one another in a circumferential direction of the rotor; wherein slots receiving the three-phase current stator windings are partially closed by circumferentially extending portions of the stator itself; wherein the stator has a preset number of angular regions of the same peripheral angular extent which adjoin one another in a circumferential direction of the stator; wherein each of the predetermined number of angular regions of the rotor has at least one pair of flux guidance regions facing the stator, the flux guidance regions having flux guidance properties which differ in a main direction of the rotary magnetic field; wherein each of the preset number of angular regions of the stator has at least one pair of flux guidance regions facing the rotor which have flux guidance properties which differ in the main direction of the rotary magnetic field; wherein the flux guidance regions with low magnetic resistance of the stator are located radially inwardly of the partially closed slots; and wherein the preset number of angular regions on the stator differs from the predetermined number of angular regions on the rotor by an integral multiple of the number of poles of the three-phase current stator winding.

2. Reluctance motor according to claim 1, wherein the preset number of angular regions on the stator differs from the predetermined number of angular regions on the rotor by the sample pole number.

3. Reluctance motor as claimed in claim 1, wherein the flux guidance regions of different flux guidance properties are formed alternately by air and the ferromagnetic material of at least one of the stator and the rotor.

4. Reluctance motor as claimed in claim 3, wherein the three-phase current stator winding has a number of slots; and wherein the number of angular regions of the stator corresponds to the number of slots provided in the three-phase current stator winding.

5. Reluctance motor as claimed in claim 1, wherein the three-phase current stator winding has 2 poles.

6. Reluctance motor as claimed in claim 1, wherein the three-phase current stator winding has 4 poles.

7. Reluctance motor as claimed in claim 1, wherein the number of angular regions on the stator and on the rotor is greater than the number of poles of the three-phase current winding 8. Reluctance motor as claimed in claim 1, wherein the number of angular regions on the stator and on the rotor is greater than the number of poles of the three-phase current winding by a factor of at least 5.

9. Reluctance motor as claimed in claim 1, wherein the flux guidance regions of the stator have a width which corresponds to widths of the flux guidance regions of the rotor.

10. Reluctance motor as claimed in claim 1, wherein the stator and the rotor each have at least one additional layer of flux guidance region pairs with flux guidance properties which differ alternately in the main direction of the rotary field; and wherein the at least one additional layer of the stator and the rotor alternate with each other in succession.

11. Reluctance motor as claimed in claim 10, wherein the preset number of angular regions on the stator differs from the predetermined number of angular regions on the rotor by the simple pole number.

12. Reluctance motor as claimed in claim 1, wherein the rotor is external of the stator.

13. Reluctance motor as claimed in claim 1, wherein the flux guidance regions of different flux guidance properties are formed by permanent magnets which are located on one of the stator and the rotor, and which are polarized oppositely in the main direction of the rotary field.

14. Reluctance motor as claimed in claim 13, wherein the preset number of angular regions on the stator differs from the predetermined number of angular regions on the rotor by the simple pole number of the three-phase current stator winding.

15. Reluctance motor as claimed in claim 14, wherein flux guidance regions of at least one of the stator and the rotor are located in an immediate vicinity of return elements of the said at least one of the stator and the rotor, are made of ferromagnetic material and are roughly half as high as wide in the main direction of the rotary field.

16. Reluctance motor as claimed in claim 1, wherein bars of a squirrel-cage damper winding run in recesses in the ferromagnetic material of the rotor to form flux guidance regions of low magnetic permeability.

17. Reluctance motor as claimed in claim 1, wherein the flux guidance regions of ferromagnetic material are formed of stacked electric steel sheets which are insulated from one another.

18. Reluctance motor as claimed in claim 1, wherein the flux guidance regions of at least one of the stator and the rotor extend in a direction which is inclined relative to a direction of rotation of the rotor.

19. Reluctance motor as claimed in claim 1, wherein the stator and the rotor include a radial air gap.

20. Reluctance motor as claimed in claim 1, wherein a transducer of a resolver is located on the shaft.

21. Reluctance motor with a stator comprising a three-phase current stator winding with a number of poles for generating a rotary magnetic field and a rotor which is located on a shaft and is made primarily of a ferromagnetic material, the rotor having a predetermined number of angular regions of a like peripheral angular extent which adjoin one another in a circumferential direction of the rotor; wherein the stator has a preset number of angular regions of the same peripheral angular extent which adjoin one another in a circumferential direction of the stator, wherein each of the predetermined number of angular regions of the rotor has at least one pair of flux guidance regions facing the stator, the flux guidance regions having flux guidance properties which differ in a main direction of the rotary magnetic field; wherein each of the preset number of angular regions of the stator has at least one pair of flux guidance regions facing the rotor which have flux guidance properties which differ in the main direction of the rotary magnetic field, wherein the preset number of angular regions on the stator differs from the predetermined number of angular regions on the rotor by an integral multiple of the number of poles of the three-phase current stator winding wherein a reduction rotor is provided floating on the shaft between the stator and rotor, wherein the reduction rotor has a predetermined number of angular regions of the same peripheral angle which adjoin one another in the circumferential direction on a surface facing the stator and each of which have a pair of flux guidance regions with flux guidance properties which differ in the main direction of the rotary field; and wherein the reduction rotor, on a surface facing the rotor, has a preset number of angular regions of the same angular extent which adjoin one another in the circumferential direction and each of which has a pair of flux guidance regions with flux guidance properties which differ in the main direction of the rotary field; and wherein the number of angular regions on the stator differs from the number of angular regions on the surface of the reduction rotor facing the stator to the same extent that the number of angular regions on the surface of the reduction rotor facing the rotor differs from the number of angular regions on the rotor and is equal to an integral multiple of the pole number of the three-phase current stator winding.

22. Reluctance motor as claimed in claim 1, wherein the rotor has flux guidance regions and connecting elements for connection to the shaft; and wherein a flux guidance rotor is provided which floats on the shaft and which is made of a ferromagnetic material for returning of lines of force of the rotary field.

23. Reluctance motor as claimed in claim 22, wherein the rotor is internal of the stator; wherein the rotor is in the form of a hollow cylinder; and wherein the flux guidance rotor is located within the hollow cylinder of the rotor and is a solid cylinder supported to float relative to the shaft via bearings.

24. Reluctance motor as claimed in claim 22, wherein bars of a squirrel-cage damper winding run in recesses in the ferromagnetic material of the rotor to form flux guidance regions of low magnetic permeability.

25. Reluctance motor as claimed in claim 22, wherein the flux guidance regions are formed of stacked sheets of ferromagnetic electric steel sheets which are insulated from one another.

26. Reluctance motor as claimed in claim 22, wherein the flux guidance regions extend in a direction which is inclined relative to a direction of rotation of the rotor.

27. Reluctance motor as claimed in claim 22, wherein the stator and the rotor include a radial air gap.

28. Reluctance motor as claimed in claim 22, wherein a transducer or a resolver is located on the shaft.

* * * * *